(12) United States Patent
Mosler et al.

(10) Patent No.: US 8,061,772 B2
(45) Date of Patent: Nov. 22, 2011

(54) INTEGRATED CHILD SEAT HAVING SPECIAL FUNCTIONS

(75) Inventors: Michael Mosler, Hamburg (DE); Jovan Ulbrich-Gasparevic, Pinneberg (DE)

(73) Assignee: Airbus Operations GmbH (DE)

( * ) Notice: Subject to any disclaimer, the term of this patent is extended or adjusted under 35 U.S.C. 154(b) by 116 days.

(21) Appl. No.: 12/508,765

(22) Filed: Jul. 24, 2009

(65) Prior Publication Data
US 2010/0026063 A1     Feb. 4, 2010

Related U.S. Application Data

(60) Provisional application No. 61/137,846, filed on Aug. 4, 2008.

(30) Foreign Application Priority Data

Aug. 4, 2008   (DE) .......................... 10 2008 036 253

(51) Int. Cl.
   *A47C 15/00*   (2006.01)
(52) U.S. Cl. ....... 297/237; 297/15; 297/105; 297/250.1; 297/256.13
(58) Field of Classification Search ............... 297/15, 297/105, 108, 111, 250.1, 256.13, 236, 237
See application file for complete search history.

(56) References Cited

U.S. PATENT DOCUMENTS

| 4,555,135 | A | * | 11/1985 | Freeland | 297/105 |
| 4,768,827 | A | * | 9/1988 | Musgrove | 297/236 |
| 5,121,964 | A | * | 6/1992 | Fourrey et al. | 297/237 |
| 5,232,263 | A | | 8/1993 | D'Ull et al. | |
| 5,344,212 | A | | 9/1994 | Muller et al. | |
| 5,524,962 | A | * | 6/1996 | Fulgenzi et al. | 297/237 |
| 5,542,742 | A | | 8/1996 | Fulgenzi et al. | |
| 5,697,580 | A | | 12/1997 | Reinhardt | |
| 5,813,367 | A | | 9/1998 | O'Brien | |
| 5,915,787 | A | | 6/1999 | Brookman | |
| 6,386,629 | B1 | * | 5/2002 | Severinski et al. | 297/188.1 |
| 6,474,732 | B1 | | 11/2002 | Merensky | |
| 6,488,327 | B1 | | 12/2002 | Pearse et al. | |
| 6,494,531 | B1 | * | 12/2002 | Kim | 297/94 |
| 6,543,722 | B1 | | 4/2003 | Parrow et al. | |
| 2004/0026971 | A1 | | 2/2004 | McClellan-Derrickson | |
| 2004/0113411 | A1 | | 6/2004 | Djien | |

FOREIGN PATENT DOCUMENTS

| DE | 3800896 A1 | 9/1988 |
| DE | 19509433 A1 | 9/1995 |
| DE | 4446595 A1 | 10/1995 |
| DE | 202005008272 U1 | 9/2006 |
| EP | 348374 A1 * | 12/1989 |
| EP | 1724194 A1 | 11/2006 |
| FR | 2697785 A1 | 5/1994 |
| GB | 2407968 A | 5/2005 |
| WO | 00/40433 A1 | 7/2000 |
| WO | 2004/016479 A1 | 2/2004 |
| WO | 2006/122521 A2 | 11/2006 |
| WO | 2008/043485 A1 | 4/2008 |

* cited by examiner

*Primary Examiner* — Laurie Cranmer
(74) *Attorney, Agent, or Firm* — Lerner, David, Littenberg, Krumholz & Mentlik, LLP

(57) ABSTRACT

A passenger seat with an integrated child seat that comprises a folded-in position and a folded-out position. In its folded-in position the passenger seat can be used as a seat for an adult passenger. In its folded-out position the child seat can be used as a seat for a child seated with his/her back in forward direction.

11 Claims, 4 Drawing Sheets

INTEGRATED CHILD SEAT HAVING SPECIAL FUNCTIONS

CROSS-REFERENCE TO RELATED APPLICATIONS

This application claims the benefit of the filing date of U.S. Provisional Patent Application No. 61/137,846 filed Aug. 4, 2008, the disclosure of which is hereby incorporated herein by reference.

BACKGROUND OF THE INVENTION

The invention relates to the technical field of child seats. In particular, the invention relates to a passenger seat comprising a child seat integrated in the seating surface of the passenger seat, to an aircraft comprising such a passenger seat, to the use of such a passenger seat in an aircraft, as well as to a method.

If there are no child seats in an aircraft, parents have to hold their babies or toddlers on their laps during takeoff, landing or during the taxi phase on the ground. In flight there is the option of placing small children in so-called baby bassinets. However, in critical phases of flight baby bassinets may not provide optional protection.

TÜV-Rheinland-certified bassinets, such as Maxi Cosy Mico, Luftkid, Römer Baby Safe Plus, and Römer King Quickfix, are known, however, they may only be approved for flight operations and may not to be used for securing babies or toddlers in other motor vehicles. These child seats are at present exclusively used only in the taxi phase, the takeoff phase and the landing phase. During critical flight phases they are secured in the same way as the "adult seats".

However, such child seats may not be provided by aircraft operators, but instead may have to be provided by parents. Furthermore, these child seats may be used in an unrestricted way only on certain seats in the aircraft so that parents need to reserve a correspondingly suitable seat prior to the flight. Furthermore, aircraft operators have widely differing periods in which Lo make seat reservations, with passengers having to inform themselves in advance of these periods.

This all makes it difficult to safely accommodate small children in an aircraft.

U.S. Pat. No. 6,474,732 B discloses a child seat for an aircraft, which child seat is affixed to a wall in the aircraft.

GB 2407968 A discloses a baby bassinet whose first end is affixed to the front passenger seat, and whose second end is affixed to the waist of a person seated in the passenger seat behind the front seat.

BRIEF SUMMARY OF THE INVENTION

A child seat integrated in the seating surface of the passenger seat of a vehicle, an aircraft, the use, and a method according to the characteristics of the independent claims are stated. Exemplary embodiments of the invention are provided in the subordinate claims.

The exemplary embodiments described relate equally to the passenger seat, to the aircraft or other vehicle, to the use, and to the method.

According to an exemplary embodiment of the invention, a passenger seat comprising a child seat integrated in the seating surface of the passenger seat is stated, wherein the child seat comprises a folded-in position for use of the passenger seat as a seat for an adult passenger, and a folded-out position for use of the child seat as a seat for a child.

In other words, when required, the passenger seat can be used as a child seat for an infant or a toddler, in that the child seat integrated in the passenger seat is simply folded out. No complicated conversion measures are necessary.

This may make it possible to safely accommodate infants or toddlers on any passenger seat installed in the aircraft, be it in economy class, business class or first class.

According to a further exemplary embodiment of the invention, the child seat in its folded-in position forms at least part of the seating surface of the passenger seat.

According to a further exemplary embodiment of the invention, the passenger seat is designed for seating the adult passenger in the direction of seating when the child seat is in its folded-in position. Furthermore, in its folded out position the child seat is designed for seating the child against the direction of seating.

In this way the safety of infants or toddlers may be further enhanced because the children are seated with their backs to the direction of flight.

According to a further exemplary embodiment of the invention, the passenger seat comprises a lock-in device for clicking or snapping the backrest of the child seat into place in its folded-out position at a defined angle to the seating surface of the child seat.

This defined angle between the child-seat backrest and the child-seat seating surface is, for example, between 90 degrees and 120 degrees.

Furthermore, the seat can comprise two or several lock-in positions into which the backrest of the child seat can optionally click in. For example, the corresponding angles can be 90 degrees, 100 degrees, 110 degrees and 120 degrees, which can simply and easily be set by operating the lock-in device. For example, the lock-in device always clicks into place in the 90 degree position, and when the lock-in device is operated the seat can be pushed onward by 10 degrees. By again operating the lock-in device the seat can be tilted by a further 10 degrees, and so on.

According to a further exemplary embodiment of the invention, the lock-in device is designed for folding the backrest of the child seat out to an angle of 180 degrees to the seating surface of the child seat.

In this way the child seat may assume a lie-down position in which, for example, the infant can be changed or can sleep.

According to a further exemplary embodiment of the invention, the integrated child seat comprises a belt that is affixed to the backrest of the child seat. The child may be secured by means of this belt.

For example, the belt is designed in the form of a shoulder harness.

According to a further exemplary embodiment of the invention, the passenger seat is a passenger seat for an aircraft.

According to a further exemplary embodiment of the invention, the outside contour of the passenger seat is unchanged when compared to that of a passenger seat without an integrated child seat.

In this way it may be possible to replace already existing passenger seats with the new passenger seats with the integrated child seat, without this changing the seating arrangement in the aircraft. In other words, simple and easy retrofitting is possible.

According to a further exemplary embodiment of the invention, an aircraft with a passenger seat as described above is stated.

According to a further exemplary embodiment of the invention, the use of a passenger seat as described above, in an aircraft, is stated.

According to a further exemplary embodiment of the invention, a method for securing a child in an aircraft is stated in which the child seat is moved from a folded-in position to a folded-out position in which the child seat can be used as a seat for an infant or a toddler. In its folded-in position the child seat is at least in part located in the passenger seat that is used as a seat for an adult passenger when the child seat is folded in.

Below, exemplary embodiments of the invention are described with reference to the figures.

DETAILED DESCRIPTION

Figure 1:
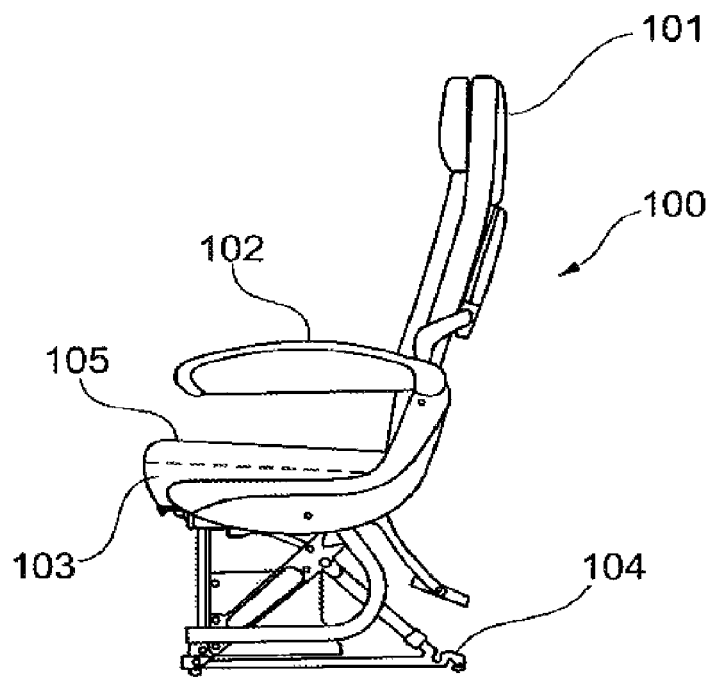
FIG. 1 shows a lateral view of a passenger seat with an integrated child seat according to an exemplary embodiment of the invention.

The illustrations in the figures are diagrammatic and not to scale.

In the following description of the figures the same reference characters are used for identical or similar elements.

FIG. 1 shows a lateral view of a passenger seat 100 with an integrated child seat. The passenger seat 100 comprises a backrest 101, a seating surface 103, an armrest 102 and a base 104 for attachment to a seat rail of the aircraft.

In relation to the installation space, the child seat may be integrated in any normal passenger seat without compromising the seating characteristics and/or the seating comfort of the "normal" passenger seat. Nor may there be any changes perceptible from the outside.

For use the seating surface or part of the seating surface can be unfolded, thus becoming the child-seat backrest 105. The child-seat backrest 105 comprises an integrated shoulder harness (see for example FIG. 4), which when in use can be locked on the lower part of the seat in a belt buckle (see reference character 401 in FIG. 4). Furthermore, the belts 302, 402 are height-adjustable by way of a corresponding grid 403, 404 in order to make it possible for them to optimally adapt to children of different sizes.

On the right and left of the lower part of the child seat there are integrated stowage compartments that provide stowage space for baby-changing utensils, toys, baby bottles etc.

The child-seat backrest 105 locks into place at a defined position, for example between 90 and 120 degrees, thus providing safety and stability for the child.

In addition, the seat can also be unfolded by 180 degrees, thus assuming a lie-down position in which there is enough space for the baby to be changed. There is thus no need to provide an additional baby bassinet and an additional baby-changing table in the aircraft.

Figure 2:
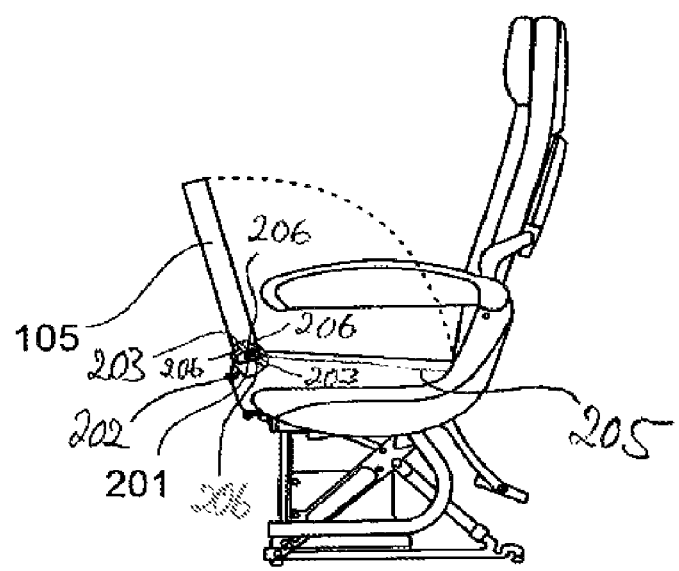
FIG. 2 shows a lateral view of the passenger seat from FIG. 1 with the child seat folded out.

FIG. 2 shows a lateral view of the passenger seat 100 from FIG. 1 with an unfolded child seat. The angle between the child-seat backrest 105 and the seating surface of the child seat is approximately 110 degrees in this exemplary embodiment. Unfolding the backrest 105 is, for example, achieved by way of an axial bearing arrangement, which may, for example, be a joint 201. The bearing arrangement or joint 201 comprises a grid or stop device 202 for fixing the backrest at a desired angle. The bearing arrangement or joint 201 is integrated in the seating surface of the passenger seat.

One embodiment provides for the stop device 202 to comprise a clamping screw 204. The joint 201 comprises, for example, two joint halves 201a, 201b that can be rotated relative to each other. The two joint halves 201a, 201b are, for example, firmly pressed together by means of clamping screw 204 that is seated on the rotary axis, and in this way the joint is made rigid (see FIG. 3).

The stop device 202 is a lock-in element 203 that is controlled by a cable device 205, which may, for example, be a Bowden cable device, which lock-in element 203 releases or locks the joint 201. With the use of lock-in element 203, which engages, for example, by corresponding lock-in means 206 so as to hold the other joint element 201, it is possible to achieve a certain angular gradation while at the same time achieving a safe holding arrangement. The invention provides for the lock-in element 203, for example, to be spring-loaded so that the lock-in element 203 is safely held in the corresponding lock-in means 206, and so that there is a rigid angular position even in the case of non-activation, similar to a dead-man's control arrangement. This is used in particular to prevent any unintended angular adjustment, for example when used with a supported person.

In order to make use of the child-seat function of the seat, the child-seat backrest 105 (child seat module) is unfolded in the direction of flight and clicks into place in the end position.

Figure 3:
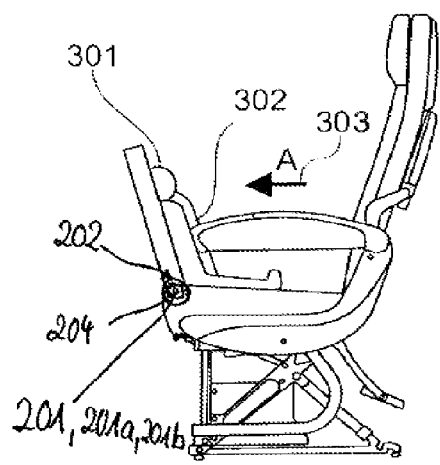
FIG. 3 shows a lateral view of a passenger seat with a child seat with belts, according to an exemplary embodiment of the invention.

FIG. 3 shows a lateral view of a passenger seat with an unfolded child-seat module and a child 301 seated thereon, which child 301 is secured by way of a belt 302. The belt is used in the form of a shoulder harness to secure the child. The arrow 303 indicates the direction of view of FIG. 4.

Figure 4:
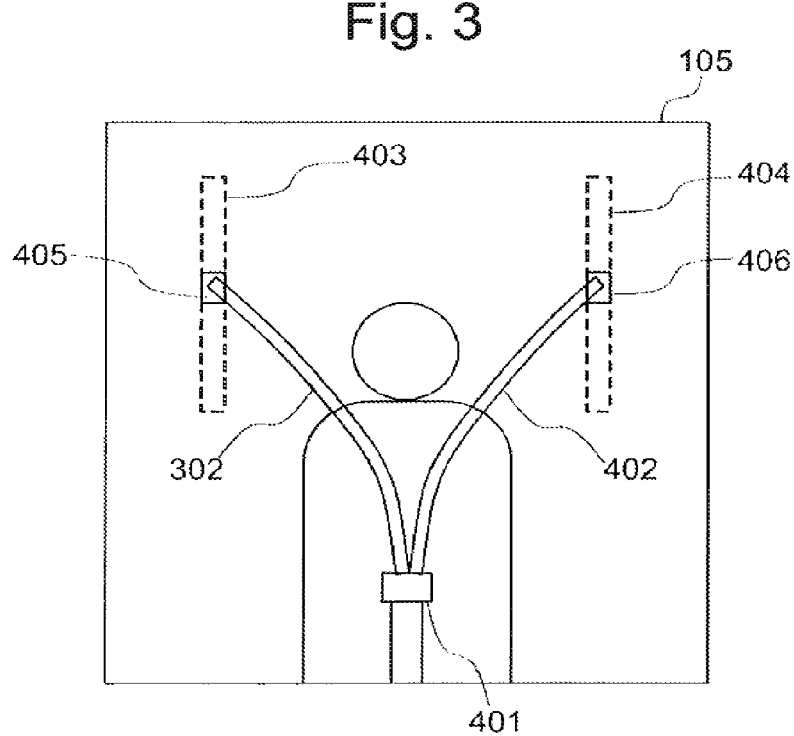
FIG. 4 shows a detailed front view of the child seat from FIG. 3.

FIG. 4 shows a front view of the child seat module with the arrangement of the belts 302, 402. The belts are height-adjustable by way of the grid arrangements 403, 404. In order to lock the height adjustment of the belts 302, 402, the stop devices 405, 406 are provided.

Furthermore, a belt buckle 401 is provided, into which the ends of the shoulder harnesses 302, 402 can be slid and secured.

Figure 5:
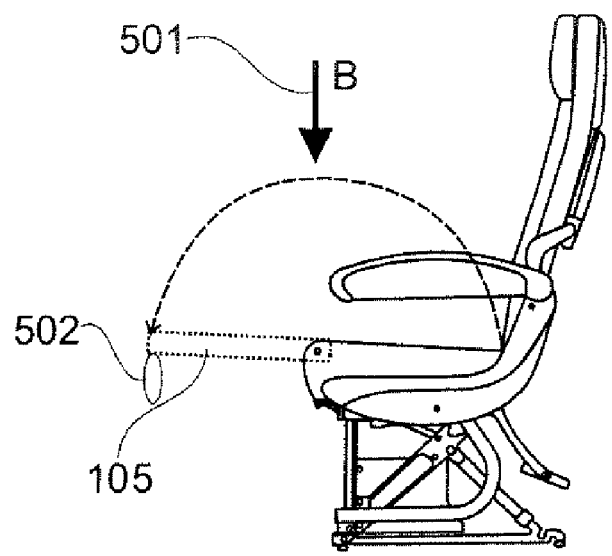
FIG. 5 shows a passenger seat with fully folded-out child seat according to an exemplary embodiment of the invention.

FIG. 5 shows a lateral view of a passenger seat in which the child seat module is folded out by 180 degrees. In this position the child seat module can be used as a baby-changing table or a baby bassinet.

Figure 6:
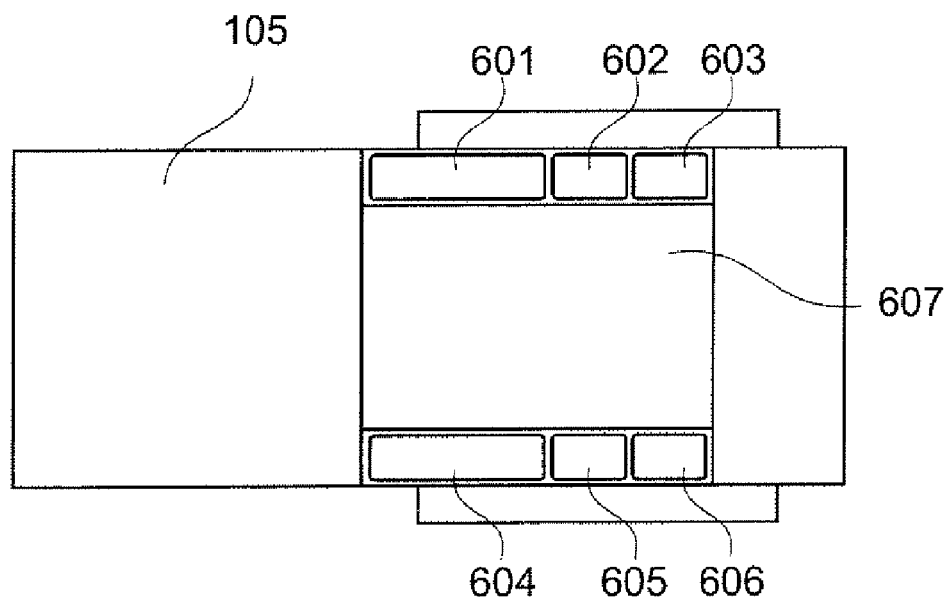
FIG. 6 shows a top view of a child seat module according to an exemplary embodiment of the invention, which seat module is folded out by 180 degrees.

The arrow 501 indicates the direction of view of FIG. 6.

Integration of the child-seat backrest 105 in the seating surface of the passenger seat such that with the child-seat backrest folded-in the passenger seat can be used as a normal passenger seat can be considered a core aspect of the invention. In an exemplary embodiment in this case the rear of the child-seat backrest is used as a seating surface for an adult passenger. If the child-seat backrest is unfolded, it automatically clicks into place in the selected position (for example at an angle of 120 degrees to horizontal). The seating surface for the child is then provided by a new seating surface, which meets the requirements of the (rearward-) seated child, which new seating surface is exposed by folding-out the child-seat backrest.

For example, the child-seat backrest 105 comprises a loop or a belt by means of which unfolding the backrest can be facilitated (see reference character 502).

Instead of an axial bearing arrangement 201 of the child-seat backrest 105, it may also be possible, when the child seat is used, to insert or click into place the backrest from above into the passenger seat (for example at an angle of 120 degrees to horizontal).

FIG. 6 shows a top view of the passenger seat with the child seat module when a child-seat backrest 105 is folded out by 180 degrees. Laterally beside the seating surface of the child seat 607 there are storage compartments 601, 602, 603 on the one side, and 604, 605, 606 on the other side, which can be used to hold baby-changing utensils, baby bottles, toys etc.

These storage compartments comprise, for example, a fold-out or slidable closing device so that the objects held therein are secured against unintended falling out.

Figure 7:
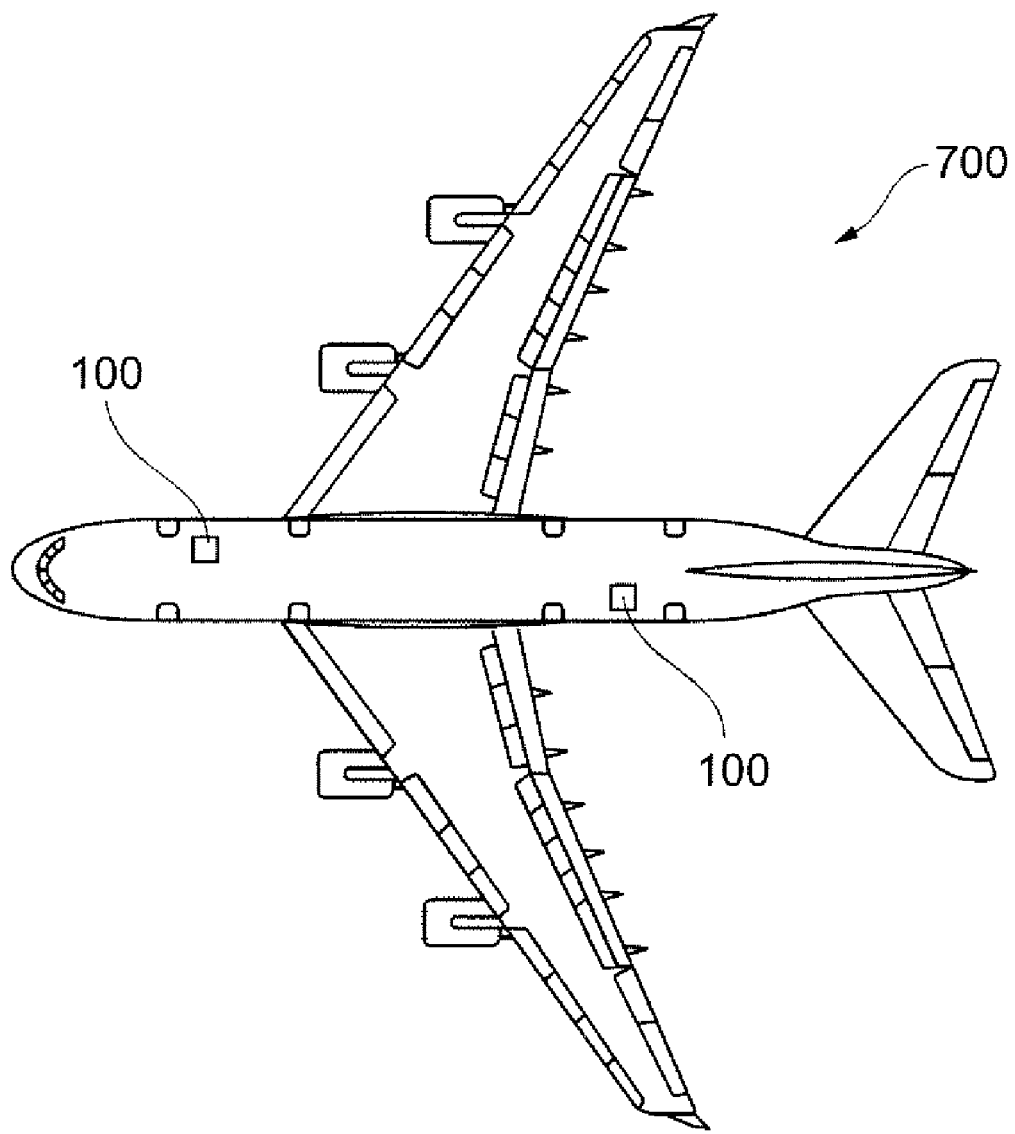
FIG. 7 shows an aircraft according to an exemplary embodiment of the invention.

FIG. 7 shows an aircraft with passenger seats 100 installed therein, according to an exemplary embodiment of the invention. The passenger seats 100 described above, with the child seat module installed therein may be installed not only in first class but also in business class and/or economy class of the aircraft 700.

The child seat described above may provide improved safety for infants and toddlers during all the flight phases. In this way the chances of infants or toddlers surviving for example in the case of a crash landing may be improved to be similar to the survival chances of the remaining passengers.

Parents do not incur any extra cost for purchasing a child seat. Nor is it necessary for parents to take child seats along for flight travel. Every seat equipped accordingly can be used either as a child seat or as a seat for adult passengers. In this way it is not necessary to reserve a seat for a special child seat.

The invention is not limited to applications in aircraft. Instead, the passenger seats may also be used in buses, rail vehicles, watercraft, or any other motor vehicles.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be considered as limitations.

The invention claimed is:

1. A passenger seat with a seating surface comprising a child seat integrated in the seating surface of the passenger seat, wherein the child seat comprises two positions:
  a folded-in position for use of the passenger seat as a seat for an adult passenger; and
  a folded-out position for use of the child seat as a seat for a child,
  wherein the passenger seat comprises a bearing arrangement with a rotator axis and which is designed for unfolding a backrest of the child seat in a direction of passenger seating;
  wherein the bearing arrangement comprises a stop device for fixing the backrest at a desired angle;
  wherein the stop device comprises a lock-in element for releasing or locking the bearing arrangement;
  wherein the lock-in element is controlled by a cable device or a Bowden cable device.

2. The passenger seat of claim 1,
  wherein the child seat in its folded-in position forms at least part of the seating surface of the passenger seat.

3. The passenger seat of claim 1,
  wherein the passenger seat is designed for seating the adult passenger in a direction of passenger seating when the child seat is in its folded-in position; and
  wherein in its folded-out position the child seat is designed for seating the child against the direction of passenger seating.

4. The passenger seat of claim 1,
  wherein the stop device is designed for snapping the backrest of the child seat into place in its folded-out position at a defined angle to a seating surface of the child seat.

5. The passenger seat of claim 4,
  wherein the defined angle is between 90 degrees and 120 degrees.

6. The passenger seat of claim 4,
  wherein the stop device is furthermore designed for folding the backrest of the child seat out to an angle of up to 180 degrees to the seating surface of the child seat.

7. The passenger seat of claim 1, further comprising:
  a belt that is integrated in the backrest of the child seat.

8. The passenger seat of claim 1,
  wherein the passenger seat is a passenger seat for an aircraft.

9. The passenger seat of claim 1,
  wherein an outside contour of the passenger seat corresponds to an outside contour of a passenger seat without an integrated child seat.

10. An aircraft comprising a passenger seat of claim 1.

11. A method for securing a child in a vehicle, with the method comprising the step of:
  moving a child seat from a folded-in position to a folded-out position for use of the child seat as a seat for an infant or a toddler,
  wherein in its folded-in position the child seat is at least in part located in a passenger seat that is used as a seat for an adult passenger when the child seat is folded-in,
  wherein the passenger seat comprises a bearing arrangement with a rotator axis and which is designed for unfolding a backrest of the child seat in a direction of passenger seating;
  wherein the bearing arrangement comprises a stop device for fixing the backrest at a desired angle;
  wherein the stop device comprises a lock-in element for releasing or locking the bearing arrangement;
  wherein the lock-in element is controlled by a cable device or a Bowden cable device.

* * * * *